(12) United States Patent
Durham et al.

(10) Patent No.: US 9,213,653 B2
(45) Date of Patent: Dec. 15, 2015

(54) MEMORY INTEGRITY

(71) Applicants: David M. Durham, Beaverton, OR (US); Men Long, Beaverton, OR (US)

(72) Inventors: David M. Durham, Beaverton, OR (US); Men Long, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 59 days.

(21) Appl. No.: 14/097,414

(22) Filed: Dec. 5, 2013

(65) Prior Publication Data

US 2015/0161059 A1 Jun. 11, 2015

(51) Int. Cl.
*G06F 21/00* (2013.01)
*H04L 29/06* (2006.01)
*G06F 12/14* (2006.01)
*G06F 21/60* (2013.01)
*G06F 21/55* (2013.01)
*G06F 21/64* (2013.01)
*G06F 7/52* (2006.01)
*G06F 21/62* (2013.01)

(52) U.S. Cl.
CPC .......... *G06F 12/1408* (2013.01); *G06F 21/554* (2013.01); *G06F 21/602* (2013.01); *G06F 21/64* (2013.01); *G06F 2212/1052* (2013.01)

(58) Field of Classification Search
CPC ... G06F 12/1408; G06F 21/302; G06F 21/64; G06F 21/554; G06F 21/602
See application file for complete search history.

(56) References Cited

FOREIGN PATENT DOCUMENTS

WO    WO 2008020279 A2 *  2/2008

OTHER PUBLICATIONS

Michael Henson, Stephen Taylor; "Memory encryption: A survey of existing techniques Apr. 2014"; Computing Surveys (CSUR), vol. 46 Issue 4; Publisher: ACM; pp. 1-26.*

* cited by examiner

*Primary Examiner* — Andrew Nalven
*Assistant Examiner* — Courtney Fields
(74) *Attorney, Agent, or Firm* — Jordan IP Law, LLC

(57) ABSTRACT

Systems and methods may provide for identifying unencrypted data including a plurality of bits, wherein the unencrypted data may be encrypted and stored in memory. In addition, a determination may be made as to whether the unencrypted data includes a random distribution of the plurality of bits. An integrity action may be implemented, for example, when the unencrypted data includes a random distribution of the plurality of bits.

24 Claims, 4 Drawing Sheets

MEMORY INTEGRITY

TECHNICAL FIELD

Embodiments generally relate to memory integrity. More particularly, embodiments relate to maintaining the integrity of memory by implementing an integrity action based on a determination whether unencrypted data includes a random distribution of a plurality of bits.

BACKGROUND

Encryption of memory in a device, such as a personal computer, a smart mobile phone, and so on, may be used to protect data stored in the memory when the device is operating, lost, stolen, and so on. Encryption of the memory may, however, remain vulnerable since the data may be corrupted by an adversary via an initial and/or repeated memory corruption attack. Thus, a processor may execute corrupt data and cause an array of undesirable effects such as, for example, a password login attempt to erroneously succeed, fail, etc., an application to misbehave, crash, etc., the device to misbehave, crash, etc., and so on. Conventional techniques may implement various strategies to maintain integrity of the memory in an attempt to minimize malicious changes to encrypted data (e.g., stored data). One technique may include utilizing parity. While being an in-line approach and having a relatively low storage cost, parity may be deterministic insofar as the adversary may successfully guess how to change bits of stored data to pass a check. Another technique may involve using relatively large codes to verify the integrity of stored data, which may not be deterministic to the adversary but may include relatively high storage cost. In addition, using codes each time data is fetched from the memory may result in a relatively large number of memory access events causing relatively high retrieval cost, performance degradation, additional power consumption, and so on.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
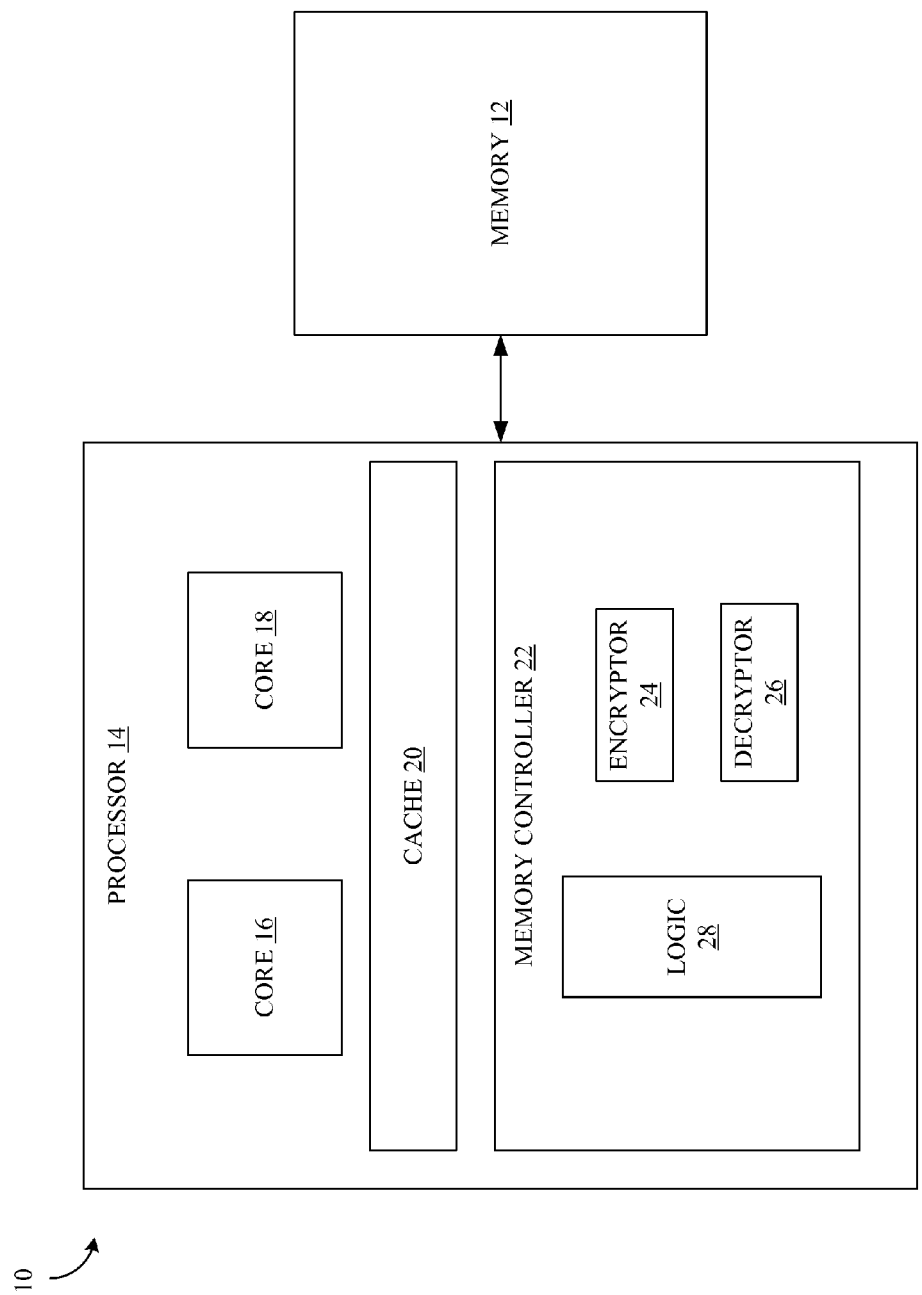
FIG. 1 is block diagram of an example of an apparatus to maintain memory integrity according to an embodiment.

Turning now to FIG. 1, an apparatus 10 to maintain memory integrity according to an embodiment is shown. The apparatus 10 may include any computing device and/or data platform such as a laptop, personal digital assistant (PDA), media content player, imaging device, mobile Internet device (MID), any smart device such as a wireless smart phone, smart tablet, smart TV, computer server, and so on, or combinations thereof. In addition, the apparatus 10 may include any platform having computing functionality (e.g., personal digital assistant/PDA, laptop, smart tablet), communications functionality (e.g., wireless smart phone), imaging functionality, media playing functionality (e.g., smart television/TV), and so on, or combinations thereof (e.g., mobile Internet device/MID).

The illustrated apparatus 10 includes memory 12. The memory 12 may be external to a processor 14 (e.g., external memory), and/or may be coupled to the processor 14 by, for example, a memory bus. In addition, the memory 12 may be implemented as main memory. The memory 12 may include, for example, volatile memory, non-volatile memory, and so on, or combinations thereof. For example, the memory 12 may include dynamic random access memory (DRAM) configured as one or more memory modules such as, for example, dual inline memory modules (DIMMs), small outline DIMMs (SODIMMs), etc., read-only memory (ROM) (e.g., programmable read-only memory (PROM), erasable PROM (EPROM), electrically EPROM (EEPROM), etc.), phase change memory (PCM), and so on, or combinations thereof. The memory 12 may include an array of memory cells arranged in rows and columns, partitioned into independently addressable storage locations. Thus, access to the memory 12 may involve using an address for a storage location such as, for example, a row address identifying the row containing the storage memory location and a column address identifying the column containing the storage memory location.

The processor 14 may include any type of processor such as, for example, a micro-processor, an embedded processor, a digital signal processor (DSP), a central processing unit (CPU), a graphical processing unit (GPU), a visual processing unit (VPU), a network processor, a device to execute code to implement the technologies described herein, and so on, or combinations thereof. The processor 14 may include one or more cores such as, for example, a core 16 and a core 18. The cores 16, 18 may include a single-threaded core, a multi-threaded core including more than one hardware thread context (or "logical processor") per core, and so on, or combinations thereof. The cores 16, 18 may include an instruction decoder to recognize and/or decode an instruction (e.g., from an instruction register), to activate appropriate circuitry to execute the instruction, to verify that a stream of instructions (e.g., operation codes, etc.) will compute, and so on, or combinations thereof.

For example, the cores 16, 18 may execute one or more instructions such as a read instruction, a write instruction, an erase instruction, a move instruction, an arithmetic instruction, a control instruction, and so on, or combinations thereof. The cores 16, 18 may, for example, execute one or more instructions to move data (e.g., program data, operation code, operand, etc.) between a register (not shown) and the memory 12, to read the data from the memory 12, to write the data to the memory 12, to perform an arithmetic operation using the data (e.g., add, subtract, bitwise operation, compare, etc.), to perform a control operation associated with the data (e.g., branch, etc.), and so on, or combinations thereof. The instructions may include any code representation such as, for example, binary code, octal code, and/or hexadecimal code (e.g., machine language), symbolic code (e.g., assembly language), decimal code, alphanumeric code, higher-level programming language code, and so on, or combinations thereof. Thus, for example, hexadecimal code may be used to represent an operation code (e.g., opcode) of an x86 instruction set including a byte value "00" for an add operation, a byte value "8B" for a move operation, a byte value "FF" for an increment/decrement operation, and so on.

The processor 14 may include internal storage such as, for example, a processor cache including one or more levels. The processor cache may not be encrypted and/or may share a same die as the processor 14, on the same chip. In addition, the processor cache may be integrated onto one or more of the cores 16, 18. The illustrated processor 14 includes a cache 20, which may store data (e.g., instructions, operands, program data, etc.) utilized by one or more components of the processor 14. The cache 20 may include any type of cache such as, for example, an instruction cache, a data cache, a single level cache, a multilevel cache, a shared cache, a strictly inclusive cache, an exclusive cache, and so on, or combinations thereof. For example, the cache 20 may include a mid-level cache, such as level 2 (L2), level 3 (L3), level 4 (L4), or other levels of cache, a last level cache (LLC), and so on, or combinations thereof. The cores 16, 18 may check whether data is located in the cache 20 to execute one or more instructions and/or other data (e.g., program data, etc.), wherein a cache miss may cause a transfer of the data from the memory 12 to the cache 20 in a block of fixed size (e.g., cache line).

The illustrated processor 14 also includes a memory controller 22, which may couple the processor 14 with the memory 12, manage the flow of data to and/or from the memory 12, and so on, or combinations thereof. While the memory controller 22 is illustrated as integrated onto the processor 14, the memory controller 22 may be discrete logic outside the processor 14 rather than integrated therein. Similarly, components illustrated as integrated onto the memory controller 22 may be discrete logic outside the memory controller 22 rather than integrated therein. Each core 16, 18 may be, for example, coupled with respective memory via a respective memory controller, coupled with shared memory via a shared memory controller, coupled with respective memory via a shared memory controller, and so on, or combinations thereof. In addition, a shared cache may be coupled with a shared memory controller, a plurality of caches may be coupled with a plurality of respective memory controllers, and so on, and combinations thereof. For example, the memory controller 22 may be shared among the cores 16, 18, may be coupled with the cache 20 (e.g., shared multilevel cache), and may couple the cores 16, 18 with the memory 12 (e.g., shared DRAM). The memory controller 22 may be coupled with the memory 12 (e.g., external memory, DRAM, etc.), for example, via a memory bus.

In addition, the illustrated memory controller 22 includes an encryptor 24, which may encrypt unencrypted data. The unencrypted data may include, for example, cleartext data, plaintext data, and so on, or combinations thereof. The cleartext data may be subject to encoding in a special format (e.g., hypertext transfer markup language (HTML), rich text format (RTF), etc.) and read by an appropriate program (e.g., word processor, text editor, etc.) without the need for decryption. The plaintext data may include pre-encryption data such as, for example, cleartext data which is to be encrypted prior to transmission and/or storage. In addition, the plaintext data may include post-decryption data such as, for example, data which is the result of decryption on received and/or retrieved data.

Additionally, the plaintext data may include data which is encodable in any format, such as audio/video data (e.g., moving picture experts group (MPEG) data, etc.), image data (e.g., joint photographic experts group (JPEG) data, etc.), financial data (e.g., automatic transfer machine (ATM) transaction data, etc.) and so on, or combinations thereof. The plaintext data may include program data such as, for example, at least a part of a program, an operating system (OS), an application, a virtual machine (e.g., Virtual Machine Monitor (VMM) code, etc.), and so on, or combinations thereof. The plaintext data may also include, for example, an instruction including an opcode, an operand, and so on, or combinations thereof.

The unencrypted data may include a plurality of bits. The plurality of bits may include one or more bits (e.g., a byte, etc.) in any code representation, such as binary code, octal code, hexadecimal code, symbolic code, decimal code, alphanumeric code, higher-level programming language code, and so on, or combinations thereof. For example, a memory reference instruction may include a bit for an opcode, a bit for an address, and so on, wherein the bits of the memory reference instruction may be represented in hexadecimal code (e.g. machine language), in symbolic code (e.g., assembly language), and so on, or combinations thereof. Additionally, the plurality of bits may be translated to and/or from binary code, wherein the binary code may be executed by the cores 16, 18, may be sorted at the memory 12, may be fetched from the memory 12, and so on, or combinations thereof.

The encryptor 24 may include any type of cipher to generate cyphertext data such as, for example, a block cipher in any desired mode of operation. The block cipher may include a fixed block size, wherein the block cipher may be repeatedly implemented to encrypt data larger than the block size. For example, the block cipher may include Advanced Encryption Standard (AES) in a propagating cipher-block chaining (PCBC) mode of operation. In addition, the block cipher may include an expandable block size. In one example, the block cipher is Threefish, which may be implemented to obtain an expandable block size of any length (e.g., 256 bits, 512 bits, 1024 bits, etc.).

For example, Threefish may utilize a tweak (e.g., 128 bits), which may include a memory address and/or location, and a key which may be the same width as the block, may utilize a number of rounds (e.g., 72) to encrypt for blocks of 256 bits and 1024 bits, a number of rounds (e.g., 80) for blocks of 1024 bits, and so on. Threefish may utilize a function MIX including an addition operation, a rotation operation by a constant, and an exclusive-or (XOR) operation. Words may be permutated, for example, after each set of MIX functions (e.g., 2, 4, or 8, respectively by block size). A subkey may be injected into the system, for example, every number of rounds (e.g., 4) wherein the subkey may be generated by parts of the key, the tweak, and a counter value. The key and the tweak may be given an extra word at the end (e.g., an XOR of all the other words).

The illustrated memory controller 22 also includes a decryptor 26, which may decrypt ciphertext data to generate unencrypted data. The decryptor 26 may include an inverse of the encryptor 24. For example the decryptor 26 may include an inverse of AES-PCBC. In addition, the decryptor 26 may include an inverse of Threefish. For example, the subkeys may be applied in reverse order, with each round including the reverse word permutation followed by the reverse MIX functions. Thus, unencrypted data (e.g., plaintext data) may be implemented as input to the encryptor 24 to generate an unreadable copy of the unencrypted data (e.g., ciphertext data) when the unencrypted data is to be stored in the memory 12 (e.g., write instruction), wherein the decryptor 26 may be implemented to decrypt the ciphertext data and generate the unencrypted data when the ciphertext data is to be fetched from the memory 12 (e.g., read instruction).

The illustrated memory controller 22 also includes logic 28, which may utilize components of the processor 14 such as, for example, the cores 16, 18, the encryptor 24, the decryptor 26, etc., to maintain (e.g., ensure, verify, test, etc.) the integrity of the memory 14. For example, the logic 28 may identify unencrypted data (e.g., pre-encryption data, post-decryption data, etc.) including a plurality of bits. In addition, the logic 28 may identify unencrypted data which may be involved in a memory transaction such as, for example, unencrypted data involved in a read operation from the memory 12 (e.g., post-decryption data), unencrypted data involved in a write operation to the memory 12 (e.g., pre-encryption data), and so on, or combinations thereof. Additionally, the logic 28 may make a determination whether the unencrypted data includes a random distribution of the plurality of bits. For example, the logic 28 may determine whether the plurality of bits includes a pattern, a random distribution, and so on, or combinations thereof.

The logic 28 may make the determination using any calculated and/or retrieved information. The information may correspond to, for example, the type of data (e.g., instructions, program data, etc.). The logic 28 may, for example, examine program data over an amount of memory (e.g., gigabytes of memory) to determine typical patterns appearing at a particular frequency, including relatively common patterns, relatively obscure patterns, and so on, or combinations thereof. In addition, the logic 28 may retrieve information regarding typical patterns from storage such as, for example, memory, a server, etc., from a data structure such as, for example, a table, etc., and so on, or combinations thereof. In one example, program data which is typically stored in the memory 14, fetched, and then decrypted may include more zero (0) bits than one (1) bits. Thus, the logic 28 may identify that more zero (0) bits than one (1) bits are typically encountered in a cache line for program data, and use the pattern to determine whether the unencrypted data includes a random distribution of the plurality of bits.

In addition, a Boolean true-false test (e.g., 32 bits) may be encountered for authentication operations such as, for example, using a password to log into a computing platform. The logic 28 may determine that the plurality of bits includes a pattern by identifying that a sequence of bits includes a first bit set to one (1), a second bit set to zero (0), and the remaining thirty bits set to zero (0) for a typical thirty-two bit true-false test. Additionally, the logic 28 may determine that the plurality of bits includes a pattern by identifying related patterns that may have a tendency to share the same cache line (e.g., based on the type of data). For example, the logic 28 may identify that instruction data such as, for example, x86 instructions may tend to share a cache line with other instruction data (e.g., x86 instructions, etc.), that program data may tend to share a cache line with other program data, that instruction data may tend to be located at a separate cache line relative to program data, and so on, or combinations thereof. The logic 28 may also identify that a sequence of bits for a type of data may tend to appear together. For example, HTML bit sequences (e.g., HTML patterns) may tend to appear together, ASCII bit sequences (e.g., ACSII patterns) may tend to appear together, MPEG bit sequences (e.g., MPEG patterns) and tend to appear together, and so on.

In addition, the logic 28 may retrieve an instruction set such as, for example, an x86 instruction set from the memory 12 and use corresponding values (e.g., byte values) to determine whether the unencrypted data includes a random distribution of the plurality of bits. Thus, the memory controller 22 may verify whether an unencrypted cache line includes a valid stream of instructions such as, for example, a valid stream of x86 instructions, opcodes, etc., to make the determination. For example, the logic 28 may determine whether the plurality of bits includes a pattern by identifying instructions in the unencrypted data for basic operations, such as move, add, and so on. While the logic 28 may match patterns for an entire instruction set, the logic 28 may seek at least a part of the instruction set such as, for example, byte values "00", "FF", and/or "8B" for an x86 instruction set, which may appear frequently and/or repeatedly within a cache line of a corresponding structure (e.g., x86 structure).

Accordingly, the logic 28 may make the determination by identifying a sequence of bits appearing in the unencrypted data at a frequency. The logic 28 may also count a number of instances the sequence of bits appears in the unencrypted data. Additionally, the logic 28 may determine that the unencrypted data does not include a random distribution of the plurality of bits when the number of instances satisfies the threshold value. For example, the logic 28 may apply the following example heuristic rule for a fetch of a cache line such as, for example, a fetch of a 64-byte cache line involving "$B_0B_1B_2 \ldots B_{63}$" from DRAM to the memory controller 28, wherein "$B_0B_1B_2 \ldots B_{63}$" may correspond to program code or text section:

```
count = 0
For j in 0 = 63 {
    If B_j = = "00" or B_j = = "FF" or B_j = = "8B"
      count ++
}
If count >=9//seems like proper x86 computer program instructions
    Data integrity is good; pass data to processor
```

The logic 28 may determine whether the plurality of bits includes a pattern by identifying typical values of an instruction set (e.g., byte values "00", "FF", and/or "8B" in x86). In the example, the logic 28 may determine that the unencrypted data includes an uncorrupted (e.g., proper, valid, etc.) non-random instruction when the count is greater than or equal to a threshold value of 9. Thus, the memory controller 22 may verify whether an unencrypted cache line includes a valid stream of instructions such as, for example, a valid stream of x86 instructions, operation codes, etc., to make the determination.

Accordingly, the logic 28 may determine that the unencrypted data does not include a random distribution of the plurality of bits when the unencrypted data includes one or more typical bit sequences (e.g., a pattern) satisfying a threshold value. Conversely, the logic 28 may determine that the unencrypted data includes a random distribution of the plurality of bits when the unencrypted data does not include one or more typical bit sequences satisfying the threshold value. Thus, the logic 28 may determine that the unencrypted data is corrupt (e.g., improper, invalid, etc.) when the threshold value is not satisfied. The threshold value may be, for example, predetermined and/or set to any value. In addition, the threshold value may be set for a particular type of pattern, may be set for a combination of patterns, and so on, or combinations therefor. Additionally, the patterns may be weighed, for example, to account for relatively common patterns, relatively obscure patterns, and so on, or combinations thereof.

Additionally, the logic 28 may detect one or more typical patterns of the program data, instructions, etc., in a decrypted data block and compare the instances of the typical patterns to a probability the sequences would appear in a random distribution of bits. Of note, an opportunity to encounter a pattern may be relatively high for valid plaintext, and/or a probability of random noise creating a recognizable pattern may be relatively low. In addition, the logic 28 may implement a probability function to determine whether the unencrypted data includes a random distribution of the plurality of bits. For example, the function may include a probability density function to verify and/or test whether the unencrypted data includes a random distribution of the plurality of bits. Thus, for example, the logic 28 may implement Posterior probability density function to unencrypted data to make the determination.

The logic 28 may make a determination whether the unencrypted data includes a random distribution of the plurality of bits at any time. For example, the logic 28 may make the determination after a fetch of data (e.g., ciphertext data) from the memory 12, and after the decryptor 26 decrypts the data to generate the unencrypted data (e.g., plaintext data). The fetch may be in response to, for example, a cache miss. Of note, at least a one-bit change to encrypted data stored in the memory 12 may cause unencrypted data generated therefrom to appear random, since at least a one-bit change in the ciphertext data may cause approximately fifty percent of the bits in the corresponding unencrypted data to change, wherein the change may be diffused across substantially the entire data block.

For example, if original plaintext data is a data block of all zeros which is encrypted to form ciphertext data, a change to the ciphertext data may cause approximately fifty percent of the bits to change to ones, on average, wherein the bits of the corresponding plaintext data may appear in a random distribution (e.g., random bit flips across substantially the entire data block). The ciphertext data may be changed, for example, by flipping one or more bits, inserting a bit, deleting a bit, exchanging a bit, modifying the ciphertext data, and so on, or combinations thereof, and the logic 28 may determine that the corresponding decrypted plaintext data includes a bit difference at approximately half the total number of bits of the data block. Thus, the encryptor 24 may encrypt a 64-byte cache line of program data into a single data block of ciphertext data, wherein a change to one or more of the resulting 512 bits of the ciphertext data may cause a bit difference at approximately 256 positions out of the 512 bits in the corresponding plaintext data, which may be diffused over the substantially the entire decrypted plaintext data block. Accordingly, the logic 28 may identify a malicious n-bit change (e.g., two-bit change, all-bit change, etc.) to the ciphertext data based on a relatively random and/or high entropy decrypted plaintext result.

Moreover, the logic 28 may implement an integrity action to prevent access to the unencrypted data when the unencrypted data is corrupt. For example, the logic 28 may prevent access by prohibiting the unencrypted data to be forwarded to the cache 20, by preventing access to the memory location corresponding to unencrypted data, by causing the location in memory to be erased, and so on, or combinations thereof. In addition, the logic 28 may cause a notification (e.g., including a copy of the data, a memory location, etc.) to be issued. The notification may be issued to, for example, a predetermined location (e.g., debug environment, log, etc.), to an individual (e.g., administrator, programmer, device owner, etc.), and so on, to implement preventive action. In addition, the processor 14 may internally record a memory corruption violation by blowing a fuse and/or utilizing other on-die non-volatile memory. In this regard, on power down for example, a processor chip may recall an attack attempt and take action such as, for example, shutdown, become inoperable, etc., when a number of detected attack attempts satisfy a predetermined attack threshold value.

Additionally, the logic 28 may cause internal firmware to run, which may not depend on memory inside the processor 14, to prevent access to the corrupt data. For example, the cores 16, 18 may run microcode from, for example, ROM to prevent access to the corrupt data. The microcode may be used to take corrective action such as, for example, discovering why the memory 12 was corrupted, changing the memory 12 back to a prior uncorrupted state, resetting the apparatus 10, and so on, or combinations thereof. In addition, the logic 28 may prevent access to the corrupt data by localizing the corruption to one or more blocks of the memory 12. For example, the logic 28 may cause microcode to locate uncorrupted memory locations and allow uncorrupted program data and/or instructions to execute. Thus, the logic 28 may cause microcode to execute and kill a corrupt application, recover the functionality of the OS with remaining uncorrupted applications, and so on, or combinations thereof.

The logic 28 may also make the determination before the unencrypted data is encrypted and stored in the memory 12. In one example, pre-encryption determination logic (e.g., algorithm, hardware logic, circuit logic, etc.) may be the same as post-decryption corruption detection logic (algorithm, hardware logic, logic, etc.) to ensure that each memory operation direction such as, for example, memory read, memory write, etc., may produce the same determination for the same plaintext data. In addition, the logic 28 may determine that original unencrypted data includes a random distribution of the plurality of bits and may, in response, cause an integrity value associated with the unencrypted data to be pre-generated and stored in the memory 12 on a relatively tailored ad hoc basis.

The integrity value may include any value to verify and/or test whether the random distribution of the plurality of bits identified in unencrypted data is a result of a modification to encrypted data or is a result of a legitimate decryption by the decryptor 26. For example, the integrity value may include an integrity check value (ICV) (e.g., a hash), a message authentication code (MAC) (e.g., the same MAC produced when the same message, secret key, and initialization vector used), a message integrity code (MIC) (e.g., the same MIC produced if the same algorithm is used), a signature (e.g., produced using a private key of a key pair), and so on, or combinations thereof. Thus, the logic 28 may apply the following example heuristic rule, for example as a continuation of the example heuristic rule described above:

Else:
Fetch message authentication code (MAC) from DRAM
If MAC invalid
Log the error in hardware and reboot machine
else
Data integrity is good; pass data to processor The logic 28 may make a further determination (e.g., a second determination, etc.) whether the unencrypted data includes a random distribution of the plurality of bits after a fetch of data (e.g., ciphertext data) from the memory 12 and after the decryptor 26 decrypts the data to generate the unencrypted data (e.g., plaintext data). The fetch may be in response to, for example, a cache miss. In addition, the logic 28 may cause a fetch of the integrity value, for example after a check to determine if any exists, from the memory 12 when the unencrypted data includes a random distribution of the plurality of bits, and may determine whether the unencrypted data is corrupt based on the integrity value. For example, the logic 28 may compute a hash value (e.g., digest) using the unencrypted data (e.g., message, plaintext data, etc.) and compare the hash value to the fetched integrity value (e.g., 128-bit ICV, MAC, etc.) to verify whether the unencrypted data is a result of a legitimate decryption of the original data. If the test fails, for example by a comparison mismatch, the logic 28 may determine that the unencrypted data is corrupt and may prevent access to the unencrypted data, log the event, notify software of the memory corruption, notify firmware of the memory corruption, and so on, or combinations thereof.

The logic 28 may allow access to the unencrypted data when the data does not include a random distribution of a plurality of bits. For example, the unencrypted data may be placed in the cache 20 based on identifying a pattern, based on a threshold value, based on a probability function, and so on, or combinations thereof. The uncorrupted unencrypted data may, for example, be passed to a last level cache line. Thus, the uncorrupted data may be accessible to the cores 16, 18.

The logic 28 may also maximize diffusion of at least a one-bit change. For example, AES in electronic code book (ECB) mode may extend over a fixed block size (e.g., 128 bits), which may be shorter than an atomic unit of a cache line (e.g., 64 bytes) and may minimize diffusion. The logic 28 may implement encryption over the atomic unit to maximize a random distribution of the plurality of bits, wherein at least a one-bit change may cause a random bit difference at approximately half the total number of bits, and wherein the distribution of the changed bits may be diffused across substantially the entire cache line when the cipher block size is as large as the cache line. The distribution may follow, for example, a binomial IID random distribution bit sequence.

The logic 28 may select a block cipher including a block size sufficient to maximize the diffusion such as, for example, a 128-bit cipher when the cache line is 128-bits. In addition, the logic 28 may select and/or implement an expandable block cipher (e.g., Threefish), and set the block size of the expandable block cipher equal to the granularity at which the memory 12 is to be accessed to maximize the diffusion. For example, the logic 28 may set the block size to be as large as the entire cache line. The logic 28 may set the block size to any particular number of bytes when the amount of memory to be fetched from the memory 12 is the particular number of bytes. Thus, the logic 28 may scale the block cipher to the atomic unit at which the cores 16, 18 read data from the memory 12, write data to the memory 12, and so on, or combinations thereof. As described below, the logic 28 may also implement one or more diffusers to maximize diffusion.

Figure 2:
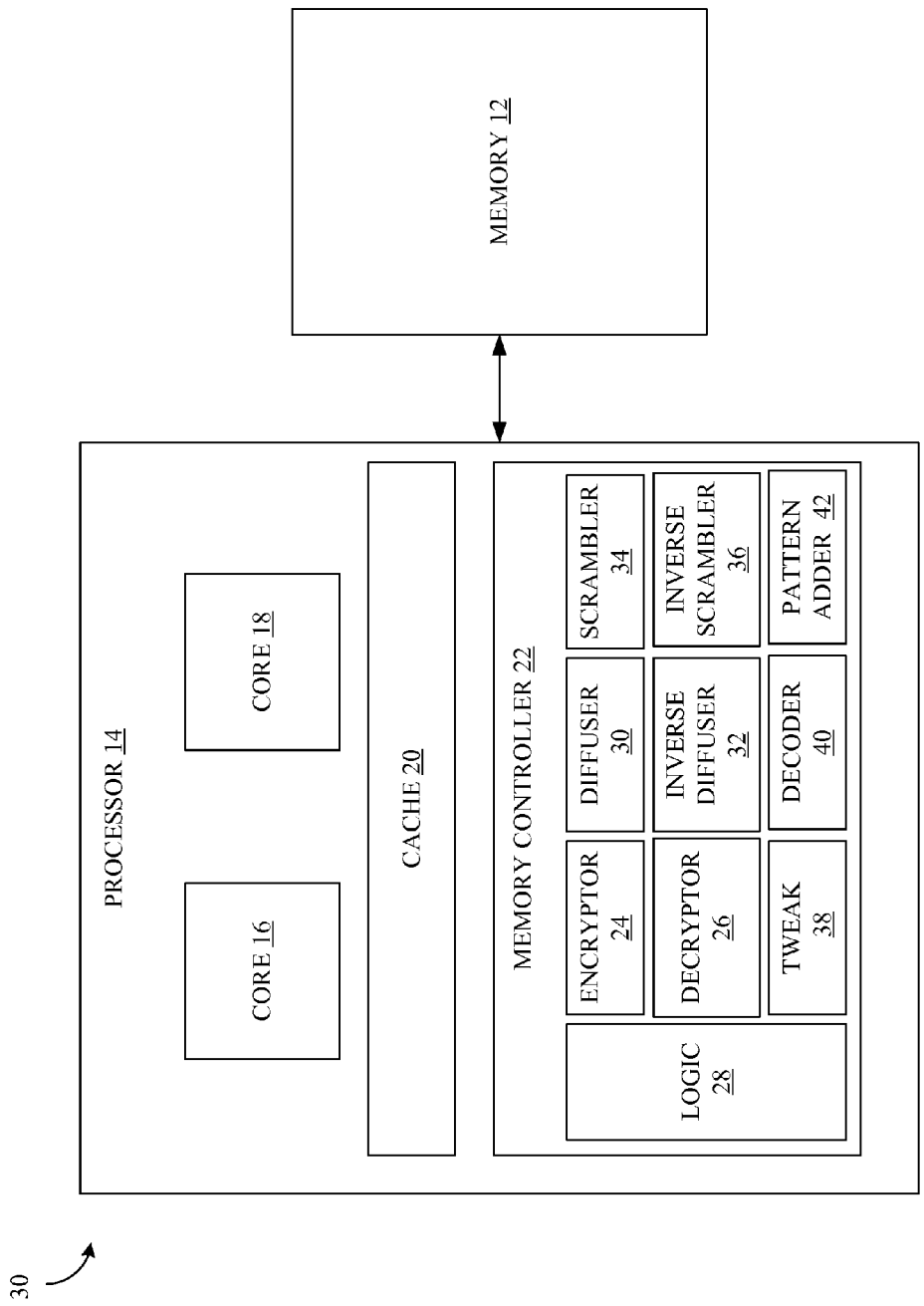
FIG. 2 is block diagram of another example of an apparatus to maintain memory integrity according to an embodiment.

FIG. 2 shows an apparatus 30 including the memory controller 22 according to an embodiment, wherein the memory controller 22 includes a diffuser 30 and an inverse diffuser 32 which may be implemented by the logic 28 to maximize diffusion. For example, the diffuser 30 may be implemented by the logic 28 to encrypt when a block size of a block cipher is less than a granularity at which the memory 12 is to be accessed. The diffuser 30 may include any block cipher in any mode of operation. The diffuser 30 may include, for example, cascading block cipher or PCBC, forward and backward, to insure that at least a single bit change (e.g., one-bit change, two-bit change, all-bit change, etc.), regardless of location, influences the bits of a fetched cache line regardless of size.

Thus, in addition to matching a cipher's block size to the cache line size described above, the logic 28 may implement AES-PCBC when a cipher is not wide enough to cover the full cache line width. AES-PCBC may run multiple times bi-directionally along the cache line (e.g., encrypt front to back, and then re-encrypt the cache line back to front) to ensure substantial diffusion across unencrypted data using cipher block chaining. The inverse diffuser 32 may include the inverse of the diffuser 30 such as, for example, an inverse of the AES-PCBC, which may be implemented by the logic 28 to decrypt the ciphertext data in a reverse manner relative to the encryption used.

The illustrated memory controller 22 also includes an address scrambler 34, which may be implemented by the logic 28 to scramble a physical memory address utilized to access the memory 12, and an inverse address scrambler 36 which may be implemented by the logic 28 to reverse the scramble of the physical memory address. The scrambler 34 may map sequential input logical address into non-sequential physical addresses, wherein memory access which may logically correspond to a row or column of the memory 12 may be scattered among multiple rows and columns of the memory 12. Thus, an adversary may not gain information about the unencrypted data otherwise available by distributing the encrypted data over random locations in the memory 12.

For example, an adversary may have a priori knowledge regarding program data (e.g., an OS, an application, etc.) related to the manner a program is addressed, is stored in the memory 12, and so on, or combinations thereof. The logic 28 may implement the scrambler 34 to map sequential input logical address into non-sequential physical memory addresses to prevent the attacker from gaining information based on the physical addresses used to store data in external storage (not shown), in the memory 12, and so on, or combinations thereof. The scrambler 34 may, for example, generate a random number per power-up of a computing platform, which may be XORed with the physical address. The inverse address scrambler 36 may include the inverse of the address scrambler 34, which may be implemented by the logic 28 to descramble in a reverse manner relative to the scramble used.

The memory controller 22 may also include a tweak function 38, which may be implemented by the logic 28 to utilize a physical memory address (e.g., scrambled, unscrambled, etc.) as a tweak to a block cipher to bind the unencrypted data with the physical memory address. The tweak function 38 may include, for example, XEX-based tweaked-codebook mode with ciphertext stealing) (XTS), LRW algorithm, and so on, or combinations thereof. Thus, an adversary may be prevented from switching and/or reordering legitimate memory encrypted data. Rather, a stored cache line may be location dependent, and/or may not be moved to other physical memory locations without failing the inline integrity check implemented by the logic 28.

The tweak function 38 may, for example, spread the original physical memory address, XOR the address with the unencrypted data, and run the result through the encryptor 24 with a key to bind the unencrypted data to the address. The logic 28 may then determine whether the unencrypted data is corrupt based on the tweak when there is a move of the ciphertext data from one memory location to a different memory location. For example, when an attack includes swapping ciphertext data to a different memory location, the decryptor 26 may decrypt the ciphertext data with the memory address corresponding to the different memory location, which would cause the corresponding unencrypted data (e.g., plaintext data) to include a random distribution of the plurality of bits. Thus, the logic 28 may determine that the unencrypted data is corrupt and prevent access to the unencrypted data.

The illustrated memory controller 22 also includes a decoder 40, which may be implemented by the logic 28. The decoder 40 may, for example, be disposed between the decryptor 26 and the logic 28. The decoder 40 may be implemented by the logic 28 at least to decode the unencrypted data and recognize one or more instructions. For example, uncorrupted unencrypted data (e.g., valid plaintext) may contain opcodes when substantially the entire cache line (e.g., a 64-byte cache line) is fetched from the memory 12 and is decrypted. Thus, the decoder 40 may recognize an opcode of an instruction set such as, for example, an x86 instruction set, etc., when the decoder 40 decodes the plaintext data. The decoder 40 may indicate a presence of instructions in the unencrypted data, and the logic 28 may utilize the input from the decoder 40 to determine whether the unencrypted data is uncorrupted, does not include a random distribution of the plurality of bits, and so on, or combinations thereof.

Additionally, the illustrated memory controller 22 includes a pattern adder 42, which may be implemented by the logic 28 to add a recognizable non-random pattern to unencrypted data before the unencrypted data is encrypted. The pattern may be added, for example, to minimize a random distribution of the plurality of bits. For example, the pattern adder 40 may be implemented by the logic 28 to generate and/or add a non-random pattern to the unencrypted data, which may be used as plaintext data input to the encryptor 24. The pattern adder 40 may add n-bits of integrity (e.g., greater than or equal to 32 bits, etc.) to an end of the unencrypted data, an intermediate portion of the unencrypted data, and so on, or combinations thereof. The added pattern may include, for example, an all zero pattern, an all ones pattern, an alternating bit pattern of zeros and ones, and so on, or combinations thereof.

In addition, the pattern adder 40 may add a replacement pattern including a fixed value (e.g., a fixed pattern) known to the logic 28. The fixed value may, for example, be added with a memory location to replace original data. The width of the replacement pattern may be the same or different (e.g., larger, smaller, etc.) than the width of the original replaced data. The replacement pattern may cause an additional ad hoc memory lookup to obtain the original data replaced with the fixed pattern and the memory location. Thus, the pattern adder 40 may replace at least a part of the unencrypted data, which may be stored in a separate memory location and/or retrieved with an additional memory read to restore the original replaced data. The pattern adder 40 may also add location information over the replaced data specifying where the original replaced data is stored in the memory 12. Thus, an ICV may not be needed and/or stored.

For example, the logic 28 may determine that cache line data will not pass a heuristic rule (e.g., a pattern test, etc.) pre-encryption, and replace at least a part of the cache line data with a fixed pattern and a memory location. The logic 28 may, in response, cause the original replaced data from the original cache line to be stored at the added memory location. In response to a memory lookup and in the event no corruption occurred, the logic 28 may recognize the added fixed pattern and use the added memory location (e.g., via a table index lookup, etc.) to cause a second read from the memory 12 to recover the original replaced data that was replaced by the fixed pattern and the memory location. Thus, the logic 28 may determine that the unencrypted data is uncorrupted and recover the original replaced data. Conversely, the logic 28 may determine that the unencrypted data is corrupt when the added fixed pattern cannot be recognized, the added memory location cannot be read, and so on, or combinations thereof.

Thus, a substantial number of bits (e.g., more than parity, less than error codes, etc.) may be added to force the unencrypted data from a random distribution of a plurality of bits to a non-random distribution of a plurality of bits, and to minimize the probability an adversary may change ciphertext data in a manner in which corresponding plaintext data may be generated to include a non-random distribution of a plurality of bits. For example, at least a one-bit change in the ciphertext data may cause a random distribution in the plurality of bits of the corresponding plaintext data (e.g., including the added pattern), wherein the logic 28 may determine that the unencrypted data is corrupt when the unencrypted data includes a random distribution of the plurality of bits (e.g., to the added pattern, to the entire data block, etc.). Additionally, the logic 28 may exclusively base the determination on the presence and/or the absence of patterns in the unencrypted data, without needing an integrity value, for example by implementing one or more recognizable patterns.

Although not illustrated in FIG. 1 or FIG. 2, the apparatus 10 and/or the apparatus 30 may include other elements on chip with the processor 14. For example, the processor 14 may include input output (IO) control logic integrated with the memory controller 22. In addition, the apparatus 10 and/or the apparatus 30 may include, for example, an IO module, sometimes referred to as a Southbridge of a chipset, that functions as a host device and may communicate with, for example, a front/rear image sensor (e.g., a two-dimensional camera, a three-dimensional camera, etc.), a microphone, a display (e.g., screen), a motion sensor (e.g., an accelerometer, a gyroscope, etc.), mass storage (e.g., hard disk drive/HDD, optical disk, flash memory, etc.), a network interface to provide a wide variety of communication functionality (e.g., cellular telephone, WiFi, WiMax Global Positioning Systems (GPS), spread spectrum (e.g., 900 MHz), other radio frequency (RF), etc.). The processor 14 and the IO module may, for example, be implemented as a system on chip (SoC). Additionally, while examples have shown separate components for illustration purposes, it is should be understood that one or more of the components of the apparatus 10 and/or the apparatus 30 may be combined, may reside in the same and/or different physical and/or virtual locations, and so on, or combinations thereof. For example, the logic 28 may include one or more of the components of the memory controller 22 to execute corresponding functionality thereof, which may reside in the same or different location as the cores 16, 18, the memory 12, and so on, or combinations thereof.

Figure 3:
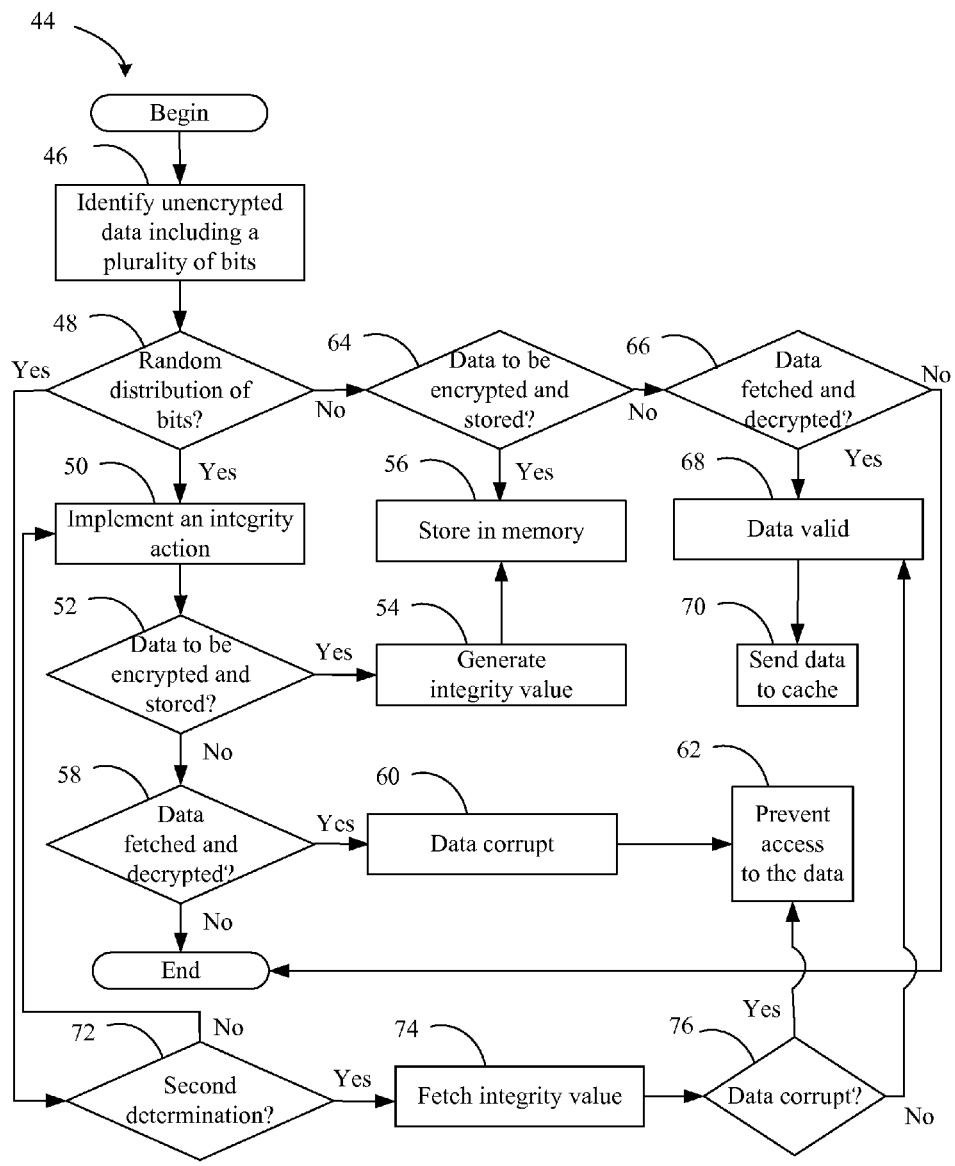
FIG. 3 is a flowchart of an example of a method of maintaining memory integrity according to an embodiment.

Turning now to FIG. 3, a method 44 of maintaining memory integrity is shown according to an embodiment. The method 44 may be implemented in an apparatus such as the apparatus 10 and/or the apparatus 30 (FIGS. 1 and 2) as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 44 may be written in any combination of one or more programming languages, including an object oriented programming language such as Java, Smalltalk, C++ or the like and conventional procedural programming languages, such as the "C" programming language or similar programming languages.

Illustrated processing block 46 provides for identifying unencrypted data including a plurality of bits. The unencrypted data may include any type of data, such as instruction data including an instruction set having one or more operation codes, operands, addresses, and so on, or combinations thereof. In addition, the unencrypted data may include program data including program code for a program, an operating system, an application, a virtual machine, and so on, or combinations thereof. The unencrypted data may include, for example, cleartext data, plaintext data, and so on, or combinations thereof. Additionally, the plurality of bits of the unencrypted data may include one or more bits (e.g., a byte) in any code representation, such as binary code, octal code, hexadecimal code, symbolic code, decimal code, alphanumeric code, higher-level programming language code, and so on, or combinations thereof.

Block 48 provides for making a determination whether the unencrypted data includes a random distribution of the plurality of bits. For example, the plurality of bits may include a pattern, a random distribution, and so on, or combinations thereof. The determination may be based on any calculated and/or retrieved information corresponding to, for example, the type of data. For example, the determination may be based on an examination of a program over an amount of memory to determine typical patterns appearing at a particular frequency, retrieving an instruction set, and so on, or combinations thereof. The determination may be made by, for example, implementing a threshold value. For example, the determination may be made by identifying a sequence of bits of the plurality of bits appearing in the unencrypted data at a frequency, counting a number of instances the sequence of bits appear in the unencrypted data, determining the unencrypted data does not include a random distribution of the plurality of bits when the number of instances satisfies the threshold value, and so on, or combinations thereof. In addition the determination may be made by, for example, implementing a probability density function. Additionally, the determination may be made by, for example, decoding unencrypted data to recognize instructions (e.g., opcodes, etc.).

Illustrated block 50 provides for implementing an integrity action when the unencrypted data includes a random distribution of a plurality of bits. The integrity action may include, for example, preventing access to the unencrypted data, issuing a notification, taking corrective action, generating an integrity value, using the integrity value, scrambling a physical memory address utilized to access memory, utilizing the physical address as a tweak to a block cipher, adding a non-random pattern to the unencrypted data, and so on, or combinations thereof. The method 44 may evaluate whether the unencrypted data is encountered before being stored in memory, after being fetched from the memory, and so on, or combinations thereof. The evaluation may facilitate implementing one or more of the integrity actions.

Thus, for example, a determination may be made at block 52 whether the unencrypted data is to be encrypted and stored. The determination whether the unencrypted data includes a random distribution of a plurality of bits may be made, therefore, before the unencrypted data is encrypted and stored in the memory. If the unencrypted data is to be encrypted and stored, the unencrypted data may include, for example, uncorrupted data. Thus, illustrated processing block 54 generates an integrity value associated with the unencrypted data, and the unencrypted data is stored together with the associated integrity value at processing block 56.

If the unencrypted data is not to be encrypted and stored, a determination may be made at block 58 whether the unencrypted data is fetched from storage and decrypted. The determination whether the unencrypted data includes a random distribution of a plurality of bits may be made, therefore, after a fetch of encrypted data from the memory and decryption of the encrypted data to generate the unencrypted data. If the unencrypted data is fetched from storage and decrypted, illustrated processing block 60 determines that the unencrypted data is corrupt, and access to the unencrypted data is prevented at processing block 62. If the unencrypted data is not fetched from storage and decrypted, the unencrypted data may not be involved in a memory transaction, and therefore the process may end by, for example, examining another data block, waiting for another data block to be encountered, and so on, or combinations thereof.

Illustrated block 64 provides for making a determination whether the unencrypted data is to be encrypted and stored when the unencrypted data does not include a random distribution of bits. The unencrypted data may include, for example, uncorrupted data. The determination whether the unencrypted data includes a random distribution of a plurality of bits may be made, therefore, before the unencrypted data is encrypted and stored in the memory. If the unencrypted data is to be encrypted and stored, the unencrypted data is stored at the processing block 56.

If the unencrypted data is not to be encrypted and stored, a determination may be made at block 66 whether the unencrypted data is fetched from storage and decrypted. The determination whether the unencrypted data includes a random distribution of a plurality of bits may be made, therefore, after a fetch of encrypted data from the memory and decryption of the data to generate the unencrypted data. If the unencrypted data is fetched from storage and decrypted, illustrated processing block 68 determines that the unencrypted data is uncorrupted (e.g., valid), and access to the unencrypted data is provided at processing block 70 by, for example, sending the unencrypted data to cache.

If the unencrypted data is not fetched from storage and decrypted, the unencrypted data may not be involved in a memory transaction, and therefore the process may end by, for example, examining another data block, waiting for another data block to be encountered, and so on, or combinations thereof. Of note, the valid unencrypted data may be subject to the integrity action at any time, such as at the processing block 56. For example, an integrity value may be generated for the valid unencrypted data, a physical memory address utilized to access memory may be scrambled for the valid unencrypted data, a physical address may be utilized as a tweak to a block cipher for the valid unencrypted data, a non-random pattern may be added to the valid unencrypted data, and so on, or combinations thereof.

In addition, if it is determined that the unencrypted data includes a random distribution of the plurality of bits at the block 48, a determination may be made at the block 72 whether a further determination was made (e.g., a second determination, etc.) at the block 48. For example, if the determination at the block 48 is a further determination (e.g., Yes) made after a fetch of the unencrypted data from the memory and decryption of the data to generate the unencrypted data, then an integrity value associated with the unencrypted data (if any) is fetched from the storage at processing block 74. If no integrity value is available, the unencrypted data may be flagged and forwarded for further analysis (e.g., logged, etc.), may be deemed to be corrupt, may not be placed in the cache, and so on, or combinations thereof.

The integrity value may be used to determine if the unencrypted data is corrupt (e.g., invalid, etc.) at block 76. The integrity value may include, for example, an ICV, a MAC, and so on, or combinations thereof. Thus, access is provided to the unencrypted data at the processing block 70 if it is determined the unencrypted is valid using the integrity code at the block 76. If it is determined the unencrypted is corrupt using the integrity code at the block 76, access to the unencrypted data is prevented at the processing block 62.

Figure 4:
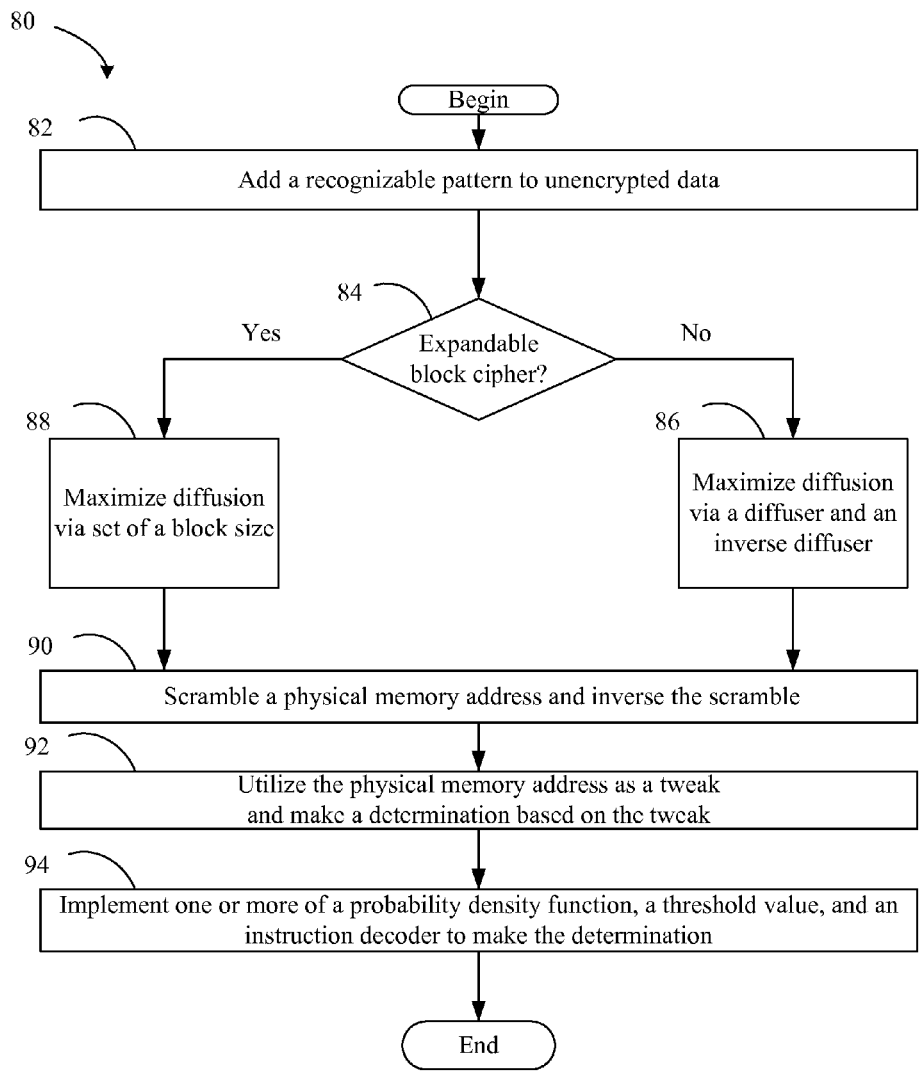
FIG. 4 is a flowchart of another example of a method of maintaining memory integrity according to an embodiment.

FIG. 4 shows another method 80 of maintaining memory integrity. The method 80 may be implemented in an apparatus such as the apparatus 10 and the apparatus 30 (FIGS. 1 and 2) as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. For example, computer program code to carry out operations shown in method 80 may be written in any combination of one or more programming languages, including an object oriented programming language such as Java, Smalltalk, C++ or the like and conventional procedural programming languages, such as the "C" programming language or similar programming languages. In addition, one or more aspects of the method 44 may be combined with one or more aspects of the method 80.

Illustrated processing block 82 provides for adding a recognizable pattern to unencrypted data before the unencrypted data is encrypted. The pattern may be added, for example, to minimize a random distribution of the plurality of bits. The processing block 82 may, for example, generate and/or add a non-random pattern to any location of the unencrypted data, which may be used as plaintext data input to an encryptor. The pattern may include, for example, an all zero pattern, an all ones pattern, an alternating bit pattern of zeros and ones, and so on, or combinations thereof. In addition, the pattern may include a replacement pattern which may include a fixed value (e.g., a fixed pattern) added together with a memory location to replace at least a part of original data.

A determination may be made at block 84 whether the encryptor includes an expandable block cipher. If not, processing block 86 may maximize diffusion via a diffuser and an inverse diffuser. For example, the processing block 86 may implement AES-PCBC when the block cipher is not wide enough to cover the full cache line width to ensure substantial diffusion of at least a one-bit change in ciphertext data across the unencrypted data. If the encryptor includes an expandable block cipher, processing block 88 may maximize diffusion by setting a block size of the expandable block cipher to ensure diffusion across the unencrypted data of at least a one-bit change, wherein the block size may be set equal to a granularity at which the memory is to be accessed. For example, the processing block 88 may set the block size of Threefish equal to 64-bytes when memory is accessed in 64-byte blocks.

Illustrated processing block 90 provides for scrambling the physical memory address utilized to access the memory, and reversing the scrambling of the physical memory address. The processing block 90 may, for example, map sequential input logical address into non-sequential physical addresses. Thus, an adversary may not gain information about the unencrypted data otherwise available by distributing the encrypted data over random locations in the memory. Illustrating processing block 92 utilizes the physical memory address (e.g., scrambled, unscrambled, etc.) as a tweak and makes a determination whether the unencrypted data includes a random distribution of a plurality of bits based on the tweak. The tweak may, for example, bind the unencrypted data with the physical memory address. Thus, swapping ciphertext data from one location in the memory to another location in the memory will allow for a determination the corresponding unencrypted data is corrupt. Illustrated processing block 94 provides for implementing one or more of a probability density function, a threshold value, and an instruction decoder to make the determination whether the unencrypted data includes a random distribution of a plurality of bits, described above.

ADDITIONAL NOTES AND EXAMPLES

Example one may include an apparatus having memory and logic to identify unencrypted data including a plurality of bits, wherein the unencrypted data is to be encrypted and stored in the memory. The logic may make a determination whether the unencrypted data includes a random distribution of the plurality of bits. The logic may also implement an integrity action when the unencrypted data includes a random distribution of the plurality of bits.

The apparatus of example one may include a processor to access the memory and execute an instruction to be associated with the unencrypted data. The apparatus of example one may include an encryptor to encrypt the unencrypted data to generate ciphertext. The apparatus of example one may also include a decryptor to decrypt the ciphertext to generate the unencrypted data. The apparatus of example one may include a cache to store the unencrypted data. The logic of example one may implement the processor, the encryptor, and/or the decryptor.

The logic of example one may implement a pattern adder to add a recognizable pattern to the unencrypted data before the unencrypted data is to be encrypted to minimize a random distribution of the plurality of bits. The logic of example one may set a block size of a block cipher to ensure diffusion across the unencrypted data of at least a one-bit change, wherein the block size may be set equal to a granularity the memory is to be accessed. The logic of example one may implement a diffuser to encrypt when a block size of a block cipher may be less than a granularity the memory may be accessed to ensure diffusion across the unencrypted data of at least a one-bit change. The logic of example one may also implement an inverse diffuser to decrypt when the block size of the block cipher may be less than the granularity the memory may be accessed to ensure diffusion across the unencrypted data of at least the one-bit change.

The logic of example one may implement an address scrambler to scramble a physical memory address utilized to access the memory. The logic of example one may implement an inverse address scrambler to reverse the scramble of the physical memory address. The logic of example one may implement a tweak function to utilize a physical memory address as a tweak to a block cipher to bind the unencrypted data with the physical memory address. The logic of example one may also make the determination based on the tweak.

The logic of example one may make the determination after a fetch of data from the memory and decryption of the data to generate the unencrypted data. The logic of example one may determine that the unencrypted data is corrupt when the unencrypted data includes a random distribution of the plurality of bits. The logic of example one may also prevent access to the unencrypted data when the unencrypted data is corrupt. The logic of example one may make the determination before the unencrypted data is encrypted and stored in the memory. The logic of example one may also generate an integrity value associated with the unencrypted data when the unencrypted data includes a random distribution of the plurality of bits, wherein the integrity value may be stored in the memory.

The logic of example one may make a second determination whether the unencrypted data includes a random distribution of the plurality of bits after a fetch of data from the memory and decryption of the data to generate the unencrypted data. The logic of example one may fetch the integrity value from the memory when the unencrypted data includes a random distribution of the plurality of bits. The logic of example one may also determine whether the unencrypted data is corrupt based on the integrity value. The logic of example one may prevent access to the unencrypted data when the unencrypted data is corrupt.

The logic of example one may implement one or more of a probability density function, a threshold value, and an instruction decoder to make the determination. The logic of example one may identify a sequence of bits of the plurality of bits which are to appear in the unencrypted data at a frequency. The logic of example one may count a number of instances the sequence of bits appear in the unencrypted data. The logic of example one may also determine that the unencrypted data does not include a random distribution of the plurality of bits when the number of instances satisfies the threshold value. The logic of example one may implement the instruction decoder to decode the unencrypted data to recognize one or more instructions.

Example two may include a memory controller having logic, at least partially comprising hardware, to identify unencrypted data including a plurality of bits, wherein the unencrypted data may be encrypted and stored in the memory. The logic may make a determination whether the unencrypted data includes a random distribution of the plurality of bits. The logic may also implement an integrity action when the unencrypted data includes a random distribution of the plurality of bits. The logic of example two may further include one or more functionality of the logic of example one. For example, the logic may implement a pattern adder to add a recognizable pattern to the unencrypted data before the unencrypted data is to be encrypted to minimize a random distribution of the plurality of bits, wherein the recognizable pattern may include a replacement pattern including a fixed value and a memory location.

Example three may include a non-transitory computer readable storage medium having a set of instructions which, if executed by a processor, cause a computer to identify unencrypted data including a plurality of bits, wherein the unencrypted data may be encrypted and stored in memory. The instructions, if executed, may also cause the computer to make a determination whether the unencrypted data includes a random distribution of the plurality of bits. In addition, the instruction, if executed, may cause the computer to implement an integrity action when the unencrypted data includes a random distribution of the plurality of bits.

Additionally, the instructions of example three, if executed, may cause the computer to add a recognizable pattern to the unencrypted data before the unencrypted data is encrypted to minimize a random distribution of the plurality of bits wherein the recognizable pattern may include a replacement pattern including a fixed value and a memory location. In addition, the instructions of example three, if executed, may cause the computer to set a block size of a block cipher to ensure diffusion across the unencrypted data of at least a one-bit change, wherein the block size may be set equal to a granularity the memory is to be accessed. In addition, the instructions of example three, if executed, may cause the computer to maximize diffusion via a diffuser and an inverse diffuser. For example, the diffuser may be implemented to encrypt when a block size of a block cipher is less than a granularity the memory is to be accessed to ensure diffusion across the unencrypted data of at least a one-bit change, and the inverse diffuser may be implemented to decrypt when the block size of the block cipher is less than the granularity the memory is to be accessed to ensure diffusion across the unencrypted data of at least the one-bit change.

Additionally, the instructions of example three, if executed, may cause the computer to scramble a physical memory address utilized to access the memory. In addition, the instructions of example three, if executed, may cause the computer to reverse the scramble of the physical memory address. Additionally, the instructions of example three, if executed, may cause the computer to utilize the physical memory address as a tweak to the block cipher to bind the unencrypted data with the physical memory address. In addition, the instructions of example three, if executed, may cause the computer to and make the determination based on the tweak.

Additionally, the instructions of example three, if executed, may cause the computer to make the determination before the unencrypted data is encrypted and stored in the memory. In addition, the instructions of example three, if executed, may cause the computer to determine that the unencrypted data is corrupt when the unencrypted data includes a random distribution of the plurality of bits. Additionally, the instructions of example three, if executed, may cause the computer to prevent access to the unencrypted data when the unencrypted data is corrupt. In addition, the instructions of example three, if executed, may cause the computer to make the determination before the unencrypted data is to be encrypted and stored in the memory. Additionally, the instructions of example three, if executed, may cause the computer to generate an integrity value associated with the unencrypted data when the unencrypted data includes a random distribution of the plurality of bits, wherein the integrity value is may be stored in the memory.

In addition, the instructions of example three, if executed, may cause the computer to make a second determination whether the unencrypted data includes a random distribution of the plurality of bits after a fetch of data from the memory and decryption of the data to generate the unencrypted data. Additionally, the instructions of example three, if executed, may cause the computer to fetch the integrity value from the memory when the unencrypted data includes a random distribution of the plurality of bits. In addition, the instructions of example three, if executed, may cause the computer to prevent access to the unencrypted data when the unencrypted data is corrupt.

Additionally, the instructions of example three, if executed, may cause the computer to implement one or more of a probability density function, a threshold value, and an instruction decoder to make the determination. In addition, the instructions of example three, if executed, may cause the computer to identify a sequence of bits of the plurality of bits which are to appear in the unencrypted data at a frequency. Additionally, the instructions of example three, if executed, may cause the computer to count a number of instances the sequence of bits appear in the unencrypted data. In addition, the instructions of example three, if executed, may cause the computer to determine that the unencrypted data does not include a random distribution of the plurality of bits when the number of instances satisfies the threshold value. Additionally, the instructions of example three, if executed, may cause the computer to implement the instruction decoder to decode the unencrypted data to recognize one or more instructions.

Example four may involve a computer implemented method including identifying unencrypted data having a plurality of bits, wherein the unencrypted data is encrypted and stored in memory. The method may also provide for making a determination whether the unencrypted data includes a random distribution of the plurality of bits. The method may further include implementing an integrity action when the unencrypted data includes a random distribution of the plurality of bits.

Additionally, the computer implemented method of example four may include adding a recognizable pattern to the unencrypted data before the unencrypted data is encrypted to minimize a random distribution of the plurality of bits, wherein the recognizable pattern may include a replacement pattern including a fixed value and a memory location. In addition, the computer implemented method of example four may include setting a block size of a block cipher to ensure diffusion across the unencrypted data of at least a one-bit change, wherein the block size is set equal to a granularity the memory is to be accessed. Additionally, the computer implemented method of example four may include maximizing diffusion via a diffuser and an inverse diffuser. For example, the diffuser may be implemented to encrypt when a block size of a block cipher is less than a granularity the memory is to be accessed to ensure diffusion across the unencrypted data of at least a one-bit change, and the inverse diffuser may be implemented to decrypt when the block size of the block cipher is less than the granularity the memory is to be accessed to ensure diffusion across the unencrypted data of at least the one-bit change.

Additionally, the computer implemented method of example four may include scrambling a physical memory address utilized to access the memory. In addition, the computer implemented method of example four may include reversing the scrambling of the physical memory address. In addition, the computer implemented method of example four may include utilizing the physical memory address as a tweak to the block cipher to bind the unencrypted data with the physical memory address. Additionally, the computer implemented method of example four may include making the determination based on the tweak.

Additionally, the computer implemented method of example four may include making the determination after a fetch of data from the memory and decryption of the data to generate the unencrypted data. In addition, the computer implemented method of example four may include determining the unencrypted data is corrupt when the unencrypted data includes a random distribution of the plurality of bits. Additionally, the computer implemented method of example four may include preventing access to the unencrypted data when the unencrypted data is corrupt.

In addition, the computer implemented method of example four may include making the determination before the unencrypted data is encrypted and stored in the memory. Additionally, the computer implemented method of example four may include generating an integrity value associated with the unencrypted data when the unencrypted data includes a random distribution of the plurality of bits, wherein the integrity value is stored in the memory. In addition, the computer implemented method of example four may include making a second determination whether the unencrypted data includes a random distribution of the plurality of bits after a fetch of data from the memory and decryption of the data to generate the unencrypted data. Additionally, the computer implemented method of example four may include fetching the integrity value from the memory when the unencrypted data includes a random distribution of the plurality of bits. In addition, the computer implemented method of example four may include determining whether the unencrypted data is corrupt based on the integrity value. Additionally, the computer implemented method of example four may include preventing access to the unencrypted data when the unencrypted data is corrupt.

Additionally, the computer implemented method of example four may include implementing one or more of a probability density function, a threshold value, and an instruction decoder to make the determination. In addition, the computer implemented method of example four may include identifying a sequence of bits of the plurality of bits which are to appear in the unencrypted data at a frequency. Additionally, the computer implemented method of example four may include counting a number of instances the sequence of bits appears in the unencrypted data. In addition, the computer implemented method of example four may include determining the unencrypted data does not include a random distribution of the plurality of bits when the number of instances satisfies the threshold value. Additionally, the computer implemented method of example four may include implement the instruction decoder is to decode the unencrypted data to recognize one or more instructions.

Example five may involve a computer implemented method including means for identifying unencrypted data having a plurality of bits, wherein the unencrypted data is encrypted and stored in memory. The method may also provide means for making a determination whether the unencrypted data includes a random distribution of the plurality of bits. The method may further include means for implementing an integrity action when the unencrypted data includes a random distribution of the plurality of bits.

Additionally, the computer implemented method of example five may include means for adding a recognizable pattern to the unencrypted data before the unencrypted data is encrypted to minimize a random distribution of the plurality of bits. Additionally, the computer implemented method of example five may include means for setting a block size of a block cipher to ensure diffusion across the unencrypted data of at least a one-bit change, wherein the block size is set equal to a granularity the memory is to be accessed. In addition, the computer implemented method of example five may include means for encrypting when a block size of a block cipher is less than a granularity the memory is to be accessed to ensure diffusion across the unencrypted data of at least a one-bit change. In addition, the computer implemented method of example five may include means for decrypting when the block size of the block cipher is less than the granularity the memory is to be accessed to ensure diffusion across the unencrypted data of at least the one-bit change.

Additionally, the computer implemented method of example five may include means for scrambling a physical memory address utilized to access the memory. In addition, the computer implemented method of example five may include means for reversing the scrambling of the physical memory address. In addition, the computer implemented method of example five may include means for utilizing the physical memory address as a tweak to the block cipher to bind the unencrypted data with the physical memory address. Additionally, the computer implemented method of example five may include means for making the determination based on the tweak.

Additionally, the computer implemented method of example five may include means for making the determination after a fetch of data from the memory and decryption of the data to generate the unencrypted data. In addition, the computer implemented method of example five may include means for determining the unencrypted data is corrupt when the unencrypted data includes a random distribution of the plurality of bits. Additionally, the computer implemented method of example five may include means for preventing access to the unencrypted data when the unencrypted data is corrupt.

In addition, the computer implemented method of example five may include means for making the determination before the unencrypted data is encrypted and stored in the memory. Additionally, the computer implemented method of example five may include means for generating an integrity value associated with the unencrypted data when the unencrypted data includes a random distribution of the plurality of bits, wherein the integrity value is stored in the memory. In addition, the computer implemented method of example five may include means for making a second determination whether the unencrypted data includes a random distribution of the plurality of bits after a fetch of data from the memory and decryption of the data to generate the unencrypted data. Additionally, the computer implemented method of example five may include means for fetching the integrity value from the memory when the unencrypted data includes a random distribution of the plurality of bits. In addition, the computer implemented method of example five may include means for determining whether the unencrypted data is corrupt based on the integrity value. Additionally, the computer implemented method of example five may include means for preventing access to the unencrypted data when the unencrypted data is corrupt.

Additionally, the computer implemented method of example five may include means for implementing one or more of a probability density function, a threshold value, and an instruction decoder to make the determination. In addition, the computer implemented method of example five may include means for identifying a sequence of bits of the plurality of bits which are to appear in the unencrypted data at a frequency. Additionally, the computer implemented method of example five may include means for counting a number of instances the sequence of bits appear in the unencrypted data. In addition, the computer implemented method of example five may include means for determining the unencrypted data does not include a random distribution of the plurality of bits when the number of instances satisfies the threshold value. Additionally, the computer implemented method of example five may include means for decoding the unencrypted data to recognize one or more instructions.

Example six may involve an apparatus including means for performing the method of example five. For example, the apparatus of example six may include means for identifying unencrypted data having a plurality of bits, wherein the unencrypted data is encrypted and stored in memory. The apparatus may also provide means for making a determination whether the unencrypted data includes a random distribution of the plurality of bits. The apparatus may further include means for implementing an integrity action when the unencrypted data includes a random distribution of the plurality of bits.

Thus, techniques described herein may enable an in-line memory integrity check which is not deterministic. In addition, techniques described herein may scale to memory since, for example, there may be substantially fewer integrity values stored in memory. Thus, there may be substantially less memory overhead and/or relatively more available memory to a program, an application, an operation system, an instruction, and so on. In addition, performance degradation associated with memory access (e.g., access for an ICV every time to verify and/or test integrity) may be minimized. In addition, an apparatus may be forced to utilize data which may always pass a heuristic rule (e.g., by adding one or more non-random patterns) to minimize the need for error correction codes. In addition, techniques described herein may minimize the execution of corrupt data, may account for maliciously swapping contents of memory, may make information related to unencrypted data based on storage location unavailable to an adversary, and so on, or combinations thereof.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
   memory, and
   logic to,
      identify unencrypted data including a plurality of bits, wherein the unencrypted data is to be encrypted and stored in the memory,
      make a determination whether the unencrypted data includes a random distribution of the plurality of bits before the unencrypted data is to be encrypted and stored in the memory,
      generate an integrity value to be associated with the unencrypted data when the unencrypted data includes a random distribution of the plurality of bits, wherein the integrity value is to be stored in the memory, and
      implement an integrity action when the unencrypted data includes a random distribution of the plurality of bits and is corrupt.

2. The apparatus of claim 1, further including:
   a processor to access the memory and execute an instruction to be associated with the unencrypted data, an encryptor to encrypt the unencrypted data to generate ciphertext, a decryptor to decrypt the ciphertext to generate the unencrypted data, and a cache to store the unencrypted data.

3. The apparatus of claim 1, wherein the logic is to implement a pattern adder to add a recognizable pattern to the unencrypted data before the unencrypted data is to be encrypted to minimize a random distribution of the plurality of bits.

4. The apparatus of claim 1, wherein the logic is to set a block size of a block cipher to ensure diffusion across the unencrypted data of at least a one-bit change, wherein the block size is to be set equal to a granularity the memory is to be accessed.

5. The apparatus of claim 1, wherein the logic is to,
implement a diffuser to encrypt when a block size of a block cipher is less than a granularity the memory is to be accessed to ensure diffusion across the unencrypted data of at least a one-bit change, and
implement an inverse diffuser to decrypt when the block size of the block cipher is less than the granularity the memory is to be accessed to ensure diffusion across the unencrypted data of at least the one-bit change.

6. The apparatus of claim 1, wherein the logic is to,
implement an address scrambler to scramble a physical memory address to be utilized to access the memory, and
implement an inverse address scrambler to reverse the scramble of the physical memory address.

7. The apparatus of claim 1, wherein the logic is to,
implement a tweak function to utilize a physical memory address as a tweak to a block cipher to bind the unencrypted data with the physical memory address, and
make the determination based on the tweak.

8. The apparatus of claim 1, where the logic is to,
make another determination whether the unencrypted data includes a random distribution of the plurality of bits after a fetch of data from the memory and decryption of the data to generate the unencrypted data,
determine that the unencrypted data is corrupt based on the determination that the unencrypted data includes a random distribution of the plurality of bits after the fetch of the data from the memory, and
prevent access to at least the portion of the unencrypted data when the unencrypted data is corrupt.

9. The apparatus of claim 1, wherein the logic is to,
make another determination whether the unencrypted data includes a random distribution of the plurality of bits after a fetch of data from the memory and decryption of the data to generate the unencrypted data,
fetch the integrity value from the memory when the unencrypted data includes a random distribution of the plurality of bits,
determine whether the unencrypted data is corrupt based on the integrity value after the fetch of the data from the memory, and
prevent access to at least the portion of the unencrypted data when the unencrypted data is corrupt.

10. The apparatus of claim 1, wherein the logic is to implement one or more of a probability density function, a threshold value, and an instruction decoder to make the determination.

11. The apparatus of claim 10, wherein the logic is to,
identify a sequence of bits of the plurality of bits which are to appear in the unencrypted data at a frequency,
count a number of instances the sequence of bits appear in the unencrypted data, and determine that the unencrypted data does not include a random distribution of the plurality of bits when the number of instances satisfies the threshold value.

12. The apparatus of claim 10, wherein the logic is to implement the instruction decoder is to decode the unencrypted data to recognize one or more instructions.

13. A memory controller comprising:
logic, at least partially comprising hardware, to,
identify unencrypted data including a plurality of bits, wherein the unencrypted data is to be encrypted and stored in memory,
make a determination whether the unencrypted data includes a random distribution of the plurality of bits before the unencrypted data is to be encrypted and stored in the memory, generate an integrity value to be associated with the unencrypted data when the unencrypted data includes a random distribution of the plurality of bits, wherein the integrity value is to be stored in the memory, and
implement an integrity action when the unencrypted data includes a random distribution of the plurality of bits and is corrupt.

14. The memory controller of claim 13, wherein the logic is to,
add a recognizable pattern to the unencrypted data before the unencrypted data is to be encrypted to minimize a random distribution of the plurality of bits, wherein the recognizable pattern is to include a replacement pattern including a fixed value and a memory location,
set a block size of a block cipher to ensure diffusion across the unencrypted data of at least a one-bit change, wherein the block size is to be set equal to a granularity the memory is to be accessed,
scramble a physical memory address to be utilized to access the memory, and reverse the scramble of the physical memory address, and
utilize the physical memory address as a tweak to the block cipher to bind the unencrypted data with the physical memory address, and make the determination based on the tweak.

15. The memory controller of claim 13, wherein the logic is to,
make another determination whether the unencrypted data includes a random distribution of the plurality of bits after a fetch of data from the memory and decryption of the data to generate the unencrypted data,
determine that the unencrypted data is corrupt based on the determination that the unencrypted data includes a random distribution of the plurality of bits after the fetch of the data from the memory, and
prevent access to at least the portion of the unencrypted data when the unencrypted data is corrupt.

16. The memory controller of claim 13, wherein the logic is to,
make another determination whether the unencrypted data includes a random distribution of the plurality of bits after a fetch of data from the memory and decryption of the data to generate the unencrypted data,
fetch the integrity value from the memory when the unencrypted data includes a random distribution of the plurality of bits,
determine whether the unencrypted data is corrupt based on the integrity value after the fetch of the data from the memory, and
prevent access to at least the portion of the unencrypted data when the unencrypted data is corrupt.

17. A non-transitory computer readable storage medium comprising a set of instructions which, if executed by a processor, cause a computer to:
identify unencrypted data including a plurality of bits, wherein the unencrypted data is to be encrypted and stored in memory;
make a determination whether the unencrypted data includes a random distribution of the plurality of bits before the unencrypted data is to be encrypted and stored in the memory;
generate an integrity value to be associated with the unencrypted data when the unencrypted data includes a random distribution of the plurality of bits, wherein the integrity value is to be stored in the memory; and
implement an integrity action when the unencrypted data includes a random distribution of the plurality of bits and is corrupt.

18. The medium of claim 17, wherein the instructions, if executed, cause the computer to:
add a recognizable pattern to the unencrypted data before the unencrypted data is to be encrypted to minimize a random distribution of the plurality of bits, wherein the recognizable pattern is to include a replacement pattern including a fixed value and a memory location;
set a block size of a block cipher to ensure diffusion across the unencrypted data of at least a one-bit change, wherein the block size is to be set equal to a granularity the memory is to be accessed;
scramble a physical memory address to be utilized to access the memory, and reverse the scramble of the physical memory address; and
utilize the physical memory address as a tweak to the block cipher to bind the unencrypted data with the physical memory address, and make the determination based on the tweak.

19. The medium of claim 17, wherein the instructions, if executed, cause the computer to:
make another determination whether the unencrypted data includes a random distribution of the plurality of bits after a fetch of data from the memory and decryption of the data to generate the unencrypted data;
determine that the unencrypted data is corrupt based on the determination that the unencrypted data includes a random distribution of the plurality of bits after the fetch of the data from the memory; and
prevent access to at least the portion of the unencrypted data when the unencrypted data is corrupt.

20. The medium of claim 17, wherein the instructions, if executed, cause the computer to:
make another determination whether the unencrypted data includes a random distribution of the plurality of bits after a fetch of data from the memory and decryption of the data to generate the unencrypted data;
fetch the integrity value from the memory when the unencrypted data includes a random distribution of the plurality of bits;
determine whether the unencrypted data is corrupt based on the integrity value after the fetch of the data from the memory; and
prevent access to at least the portion of the unencrypted data when the unencrypted data is corrupt.

21. A method comprising:
identifying unencrypted data including a plurality of bits, wherein the unencrypted data is encrypted and stored in memory;
making a determination whether the unencrypted data includes a random distribution of the plurality of bits before the unencrypted data is to be encrypted and stored in the memory; generating an integrity value to be associated with the unencrypted data when the unencrypted data includes a random distribution of the plurality of bits, wherein the integrity value is stored in the memory; and
implementing an integrity action when the unencrypted data includes a random distribution of the plurality of bits and is corrupt.

22. The method of claim 21, further including:
adding a recognizable pattern to the unencrypted data before the unencrypted data is encrypted to minimize a random distribution of the plurality of bits, wherein the recognizable pattern includes a replacement pattern including a fixed value and a memory location;
setting a block size of a block cipher to ensure diffusion across the unencrypted data of at least a one-bit change, wherein the block size is set equal to a granularity the memory is to be accessed;
scrambling a physical memory address utilized to access the memory, and reversing the scrambling of the physical memory address; and
utilizing the physical memory address as a tweak to the block cipher to bind the unencrypted data with the physical memory address, and making the determination based on the tweak.

23. The method of claim 21, further including:
making another determination whether the unencrypted data includes a random distribution of the plurality of bits after a fetch of data from the memory and decryption of the data to generate the unencrypted data;
determining the unencrypted data is corrupt based on the determination that the unencrypted data includes a random distribution of the plurality of bits after the fetch of the data from the memory; and
preventing access to at least the portion of the unencrypted data when the unencrypted data is corrupt.

24. The method of claim 21, further including:
making another determination whether the unencrypted data includes a random distribution of the plurality of bits after a fetch of data from the memory and decryption of the data to generate the unencrypted data;
fetching the integrity value from the memory when the unencrypted data includes a random distribution of the plurality of bits;
determining whether the unencrypted data is corrupt based on the integrity value after the fetch of the data from the memory; and
preventing access to at least the portion of the unencrypted data when the unencrypted data is corrupt.

* * * * *